(12) United States Patent  
Brown et al.

(10) Patent No.: US 7,308,350 B2
(45) Date of Patent: Dec. 11, 2007

(54) METHOD AND APPARATUS FOR DETERMINING ADAPTIVE BRAKE GAIN PARAMETERS FOR USE IN A SAFETY SYSTEM OF AN AUTOMOTIVE VEHICLE

(75) Inventors: Todd Brown, Dearborn, MI (US); Chuck Bannon, Northville, MI (US); Keith Mattson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 10/849,590

(22) Filed: May 20, 2004

(65) Prior Publication Data

US 2005/0261818 A1 Nov. 24, 2005

(51) Int. Cl.
*G06F 19/00* (2006.01)

(52) U.S. Cl. .............................. 701/70; 701/74; 701/78; 701/80; 303/112; 303/20; 303/1

(58) Field of Classification Search .................. 701/70, 701/74, 78, 80; 303/112, 20, 1
See application file for complete search history.

(56) References Cited

U.S. PATENT DOCUMENTS

| | | | |
|---|---|---|---|
| 2,917,126 A | 12/1959 | Phillips | |
| 3,604,273 A | 9/1971 | Kwok et al. | |
| 3,608,925 A | 9/1971 | Murphy | |
| 3,899,028 A | 8/1975 | Morris et al. | |
| 3,948,567 A | 4/1976 | Kasselmann et al. | |
| 3,972,543 A | 8/1976 | Presley et al. | |
| 4,023,864 A | 5/1977 | Lang et al. | |
| RE30,550 E | 3/1981 | Reise | |
| 4,480,714 A | 11/1984 | Yabuta et al. | |
| 4,592,565 A | 6/1986 | Eagle | |
| 4,597,462 A | 7/1986 | Sano et al. | |
| 4,650,212 A | 3/1987 | Yoshimura | |
| 4,679,808 A | 7/1987 | Ito et al. | |
| 4,690,553 A | 9/1987 | Fukamizu et al. | |
| 4,761,022 A | 8/1988 | Ohashi | |
| 4,765,649 A | 8/1988 | Ikemoto et al. | |
| 4,767,588 A | 8/1988 | Ito | |

(Continued)

FOREIGN PATENT DOCUMENTS

DE        36 16 907        11/1987

(Continued)

OTHER PUBLICATIONS

A method for reducing on-road rollovers—anti-rollover braking, Thomas J. Wielenga, Dynamotive, LLC, International Congress and Exposition, Detroit, Michigan, Mar. 1-4, 1999.

(Continued)

*Primary Examiner*—Thomas Black
*Assistant Examiner*—Marie A Weiskopf
(74) *Attorney, Agent, or Firm*—Raymond Coppiellie Dickinson Wright PLLC

(57) ABSTRACT

A control system for an automotive vehicle (10) and method for operating the same includes a controller (26) that is used to control the brake system in response to an adaptive brake gain coefficient. The adaptive brake gain coefficient may be used by a safety system so that a desired brake torque is applied to the wheel.

4 Claims, 4 Drawing Sheets

U.S. PATENT DOCUMENTS

| | | |
|---|---|---|
| 4,778,773 A | 10/1988 | Sukegawa |
| 4,809,183 A | 2/1989 | Eckert |
| 4,827,416 A | 5/1989 | Kawagoe et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,163,319 A | 11/1992 | Spies et al. |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,278,761 A | 1/1994 | Ander et al. |
| 5,282,134 A | 1/1994 | Gioutsos et al. |
| 5,311,431 A | 5/1994 | Cao et al. |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,423,600 A * | 6/1995 | Riddiford et al. ............... 303/3 |
| 5,446,658 A | 8/1995 | Pastor et al. |
| 5,510,989 A | 4/1996 | Zabler et al. |
| 5,548,536 A | 8/1996 | Ammon |
| 5,549,328 A | 8/1996 | Cubalchini |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,857,535 A | 1/1999 | Brooks |
| 5,869,943 A | 2/1999 | Nakashima et al. |
| 5,878,357 A | 3/1999 | Sivashankar et al. |
| 5,893,896 A | 4/1999 | Imamura et al. |
| 5,925,083 A | 7/1999 | Ackermann |
| 5,931,546 A | 8/1999 | Nakashima et al. |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffmann |
| 6,002,975 A | 12/1999 | Schiffmann et al. |
| 6,026,926 A | 2/2000 | Noro et al. |
| 6,038,495 A | 3/2000 | Schiffmann |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafti et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,233,510 B1 | 5/2001 | Platner et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B2 | 1/2002 | Brown et al. |
| 6,349,247 B1 | 2/2002 | Schramm et al. |
| 6,351,694 B1 | 2/2002 | Tseng et al. |

| | | | | | |
|---|---|---|---|---|---|
| 6,352,318 B1 | 3/2002 | Hosomi et al. | GB | 2 342 078 | 4/2000 |
| 6,356,188 B1 | 3/2002 | Meyers et al. | JP | 62055211 | 9/1985 |
| 6,370,938 B1 | 4/2002 | Leimbach et al. | JP | 63116918 | 5/1988 |
| 6,394,240 B1 | 5/2002 | Barwick | JP | 63151539 | 6/1988 |
| 6,397,127 B1 | 5/2002 | Meyers et al. | JP | 63203456 | 8/1988 |
| 6,419,240 B1 | 7/2002 | Burdock et al. | JP | 1101238 | 4/1989 |
| 6,428,118 B1 | 8/2002 | Blosch | JP | 2171373 | 7/1990 |
| 6,438,464 B1 | 8/2002 | Woywod et al. | JP | 3042360 | 2/1991 |
| 6,477,480 B1 | 11/2002 | Tseng et al. | JP | 3045452 | 2/1991 |
| 6,496,758 B2 | 12/2002 | Rhode et al. | JP | 4008837 | 1/1992 |
| 6,496,763 B2 | 12/2002 | Griessbach | JP | 5016699 | 1/1993 |
| 6,498,976 B1 | 12/2002 | Ehlbeck et al. | JP | 5254406 | 10/1993 |
| 6,529,803 B2 | 3/2003 | Meyers et al. | JP | 6278586 | 10/1994 |
| 6,547,022 B2 | 4/2003 | Hosomi et al. | JP | 6297985 | 10/1994 |
| 6,554,293 B1 | 4/2003 | Fennel et al. | JP | 6312612 | 11/1994 |
| 6,556,908 B1 | 4/2003 | Lu et al. | JP | 808825 | 3/1996 |
| 6,559,634 B2 | 5/2003 | Yamada | JP | 9005352 | 1/1997 |
| 6,618,656 B2 | 9/2003 | Kueblbeck et al. | JP | 10024819 | 1/1998 |
| 2002/0014799 A1 | 2/2002 | Nagae | JP | 10329682 | 12/1998 |
| 2002/0040268 A1 | 4/2002 | Yamada et al. | JP | 11011272 | 1/1999 |
| 2002/0056582 A1 | 5/2002 | Chubb | JP | 11170992 | 6/1999 |
| 2002/0075139 A1 | 6/2002 | Yamamoto et al. | JP | 11254992 | 9/1999 |
| 2002/0096003 A1 | 7/2002 | Yamada et al. | JP | 11255093 | 9/1999 |
| 2002/0139599 A1 | 10/2002 | Lu | JP | 11304663 | 10/1999 |
| 2005/0001474 A1* | 1/2005 | Zierolf ............ 303/112 | JP | 11304662 | 11/1999 |
| 2005/0240321 A1* | 10/2005 | Darke ............ 701/3 | SU | 816849 | 3/1981 |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 43 35 979 | 4/1995 |
| DE | 43 42 732 | 6/1995 |
| DE | 199 07 633 | 10/1999 |
| EP | 0 430 813 | 12/1993 |
| EP | 0 662 601 | 7/1995 |
| EP | 0 758 601 | 2/1997 |
| FR | 24 25 342 | 12/1979 |
| GB | 2257403 | 1/1993 |

OTHER PUBLICATIONS

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12th International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

* cited by examiner

US 7,308,350 B2

METHOD AND APPARATUS FOR DETERMINING ADAPTIVE BRAKE GAIN PARAMETERS FOR USE IN A SAFETY SYSTEM OF AN AUTOMOTIVE VEHICLE

TECHNICAL FIELD

The presents invention relates generally to a dynamic behavior control apparatus for an automotive vehicle, and more specifically, to a method and apparatus for adaptively determining brake gain parameters.

BACKGROUND

Dynamic control systems for automotive vehicles have recently begun to be offered on various products. Dynamic control systems typically control the yaw of the vehicle by controlling the braking effort at various wheels of the vehicle. By regulating the amount of braking at each corner of the vehicle, the desired direction of the vehicle may be maintained.

Dynamic control systems for automotive vehicles may include anti lock braking systems, yaw stability control systems and roll stability controls systems. Each of the systems may include a form of regulating braking. The amount of brake torque is equal to the product of the brake torque gain coefficient $K_{br}$ and the brake pressure at the wheel. The brake caliper pressure is estimated during all braking events and therefore the brake torque can be estimated by multiplying the brake caliper pressure by the brake torque gain coefficient $K_{br}$.

Other safety systems that use braking, such as electro hydraulic brakes, also use the brake torque gain co-efficient. The brake torque gain coefficient is assumed to be constant. However, it has been found that the brake torque gain coefficient is highly variable and thus changes due to physical parameters and environmental factors.

It would therefore be desirable to provide a system and method for determining a brake torque gain coefficient that is adaptive to various physical parameters and environmental factors so that more accurate control may be performed by various safety systems of the vehicle including dynamic controls systems and other safety systems.

SUMMARY OF THE INVENTION

The present invention provides a system and method for determining an adaptive brake gain parameter. In one aspect of the invention, a method of controlling an automotive vehicle comprises determining an adaptive brake gain coefficient and controlling a brake system in response to the adaptive brake gain coefficient.

In a further aspect of the invention, a method of controlling an automotive vehicle includes determining an axle torque, a vehicle speed and a resistive value in response to the axle torque in vehicle speed. The method further includes determining a vehicle mass and determining a brake force in response to the vehicle mass and resistive force. A brake gain coefficient is determined in response to the brake force and a brake pressure.

One feature of the invention is that the brake gain co-efficient may be continually determined, however, the brake gain coefficient used for safety system control may be used selectively based on various conditions of the vehicle.

One advantage of the invention is that various wear characteristics and environmental conditions may be factored into the brake gain coefficient determination. This allows the brake gain coefficient to more accurately be determined over time.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
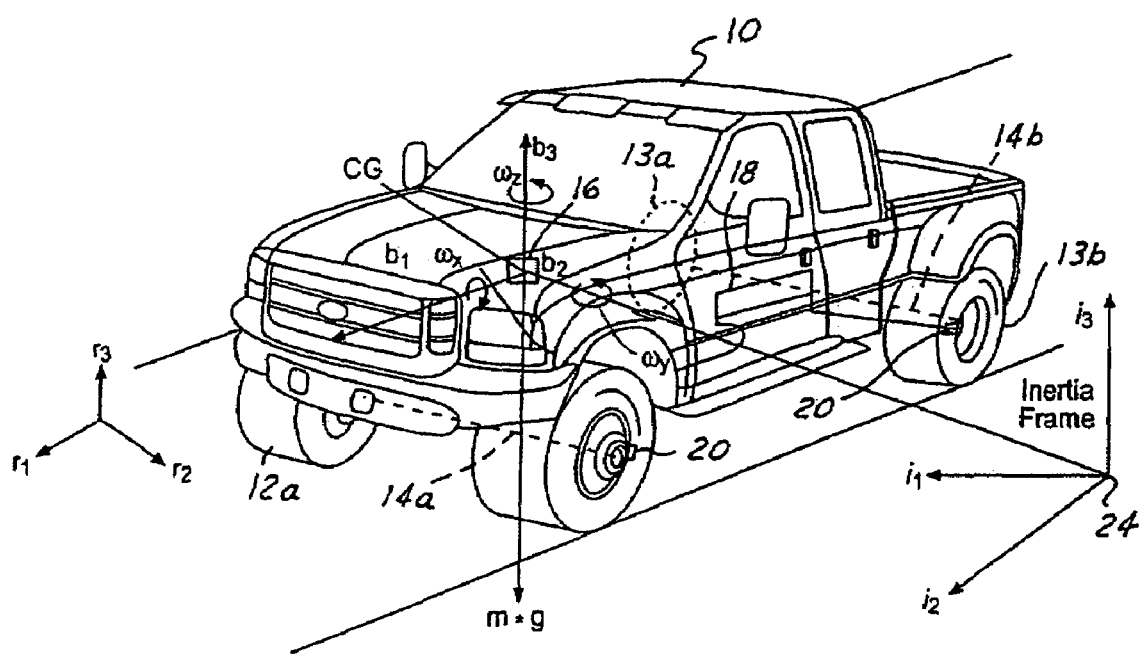
FIG. 1 is a perspective view of an automotive vehicle having a control system according to the present invention.

Referring to FIG. 1, an automotive vehicle 10 with a control system of the present invention is illustrated. Vehicle 10 has front right and front left tires 12a and 12b and rear right tires 13a and rear left tires 13a and 13b, respectively. The vehicle 10 may also have a number of different types of front steering systems 14a including having each of the front wheels configured with a respective controllable actuators and the front wheels having a conventional type system in which both of the front wheels are controlled together. The vehicle 10 has a rear axle system 14b. Generally, the vehicle has a weight represented as Mg at the center of gravity of the vehicle, where g=9.8 m/s² and M is the total mass of the vehicle.

The sensing system 16 may share sensors with other vehicle dynamic control systems such as a yaw stability control system sensor set or a roll stability control system sensor set. Of course, the actual sensors used will vary depending on the type of control system or systems implemented on the particular vehicle. The various possible sensors will be further described below. The wheel speed sensors 20 may be mounted as adjacent each wheel of the vehicle. Those skilled in the art will recognize three wheel speed sensors may be used. For example, one for the rear of the vehicle and one for each of the front two wheels. The remaining sensors of sensing system 16 are preferably mounted directly at the center of gravity of the vehicle, along the reference directions x, y and z shown in FIG. 1. As those skilled in the art will recognize the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the left side, and the $b_3$ corresponding to the z axis pointing upward. The angular rates of the car body are denoted about their respective axes as $\omega_x$ for the roll rate, $\omega_y$ for the pitch rate, and $\omega_z$ for the yaw rate. The present invention calculations preferably take place in an inertial frame 24 that may be derived from the body frame 22 as described below.

Figure 2:
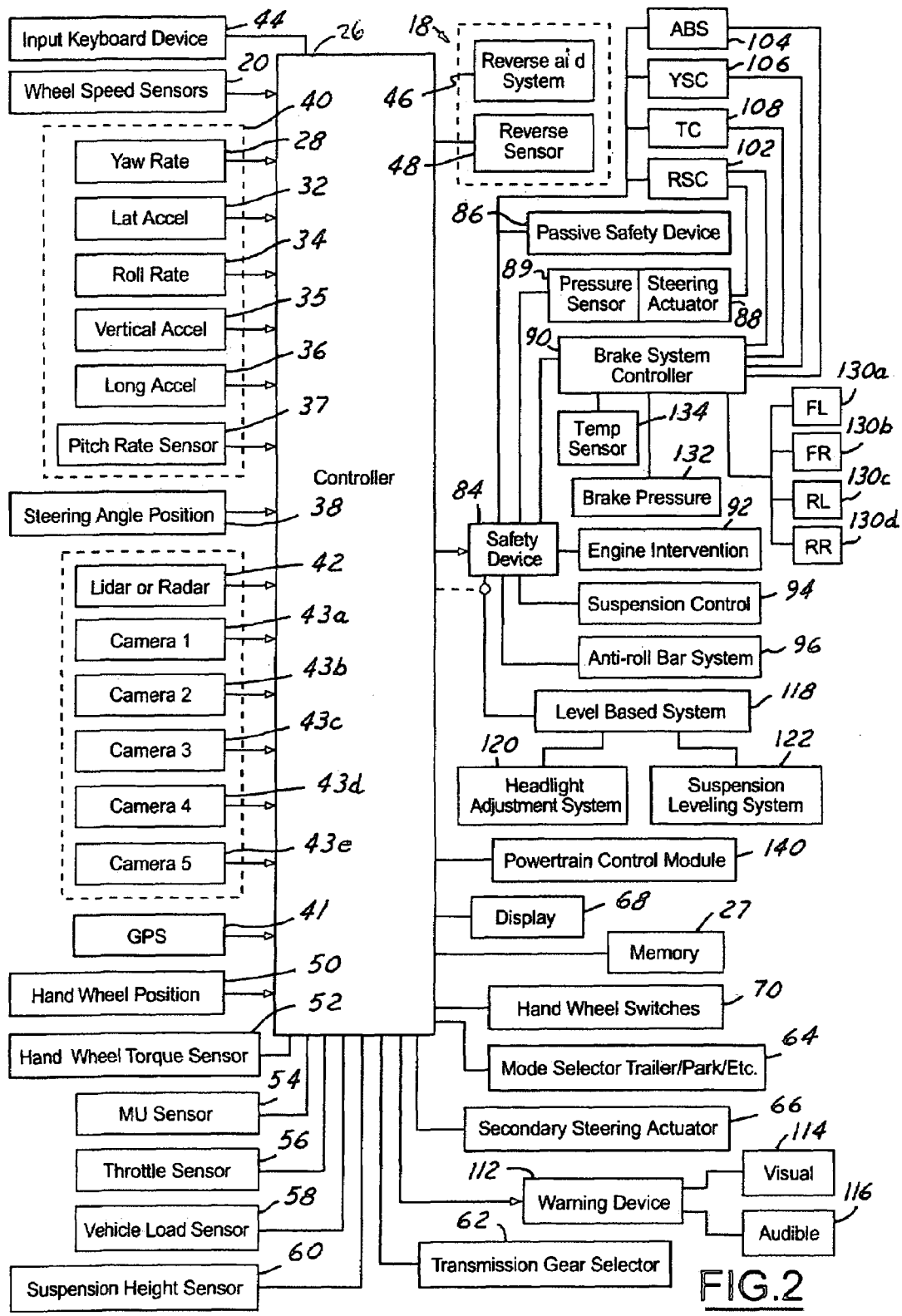
FIG. 2 is a block diagrammatic view of a control system according to the present invention.
Figure 3:
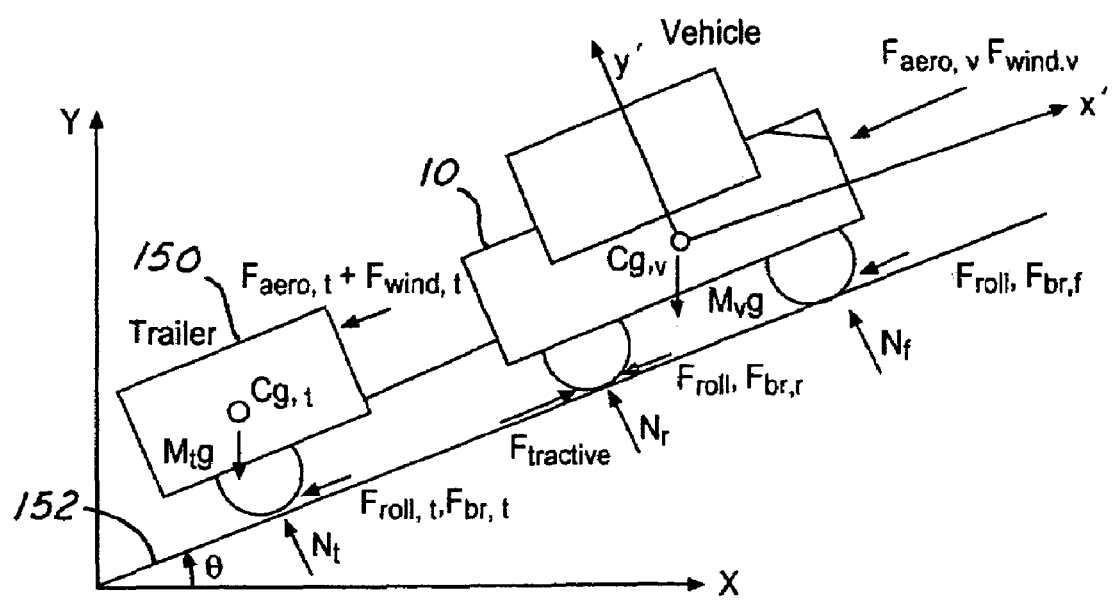
FIG. 3 is a diagrammatic view of a vehicle and trailer on a slope having various forces according to the present invention.
Figure 4:
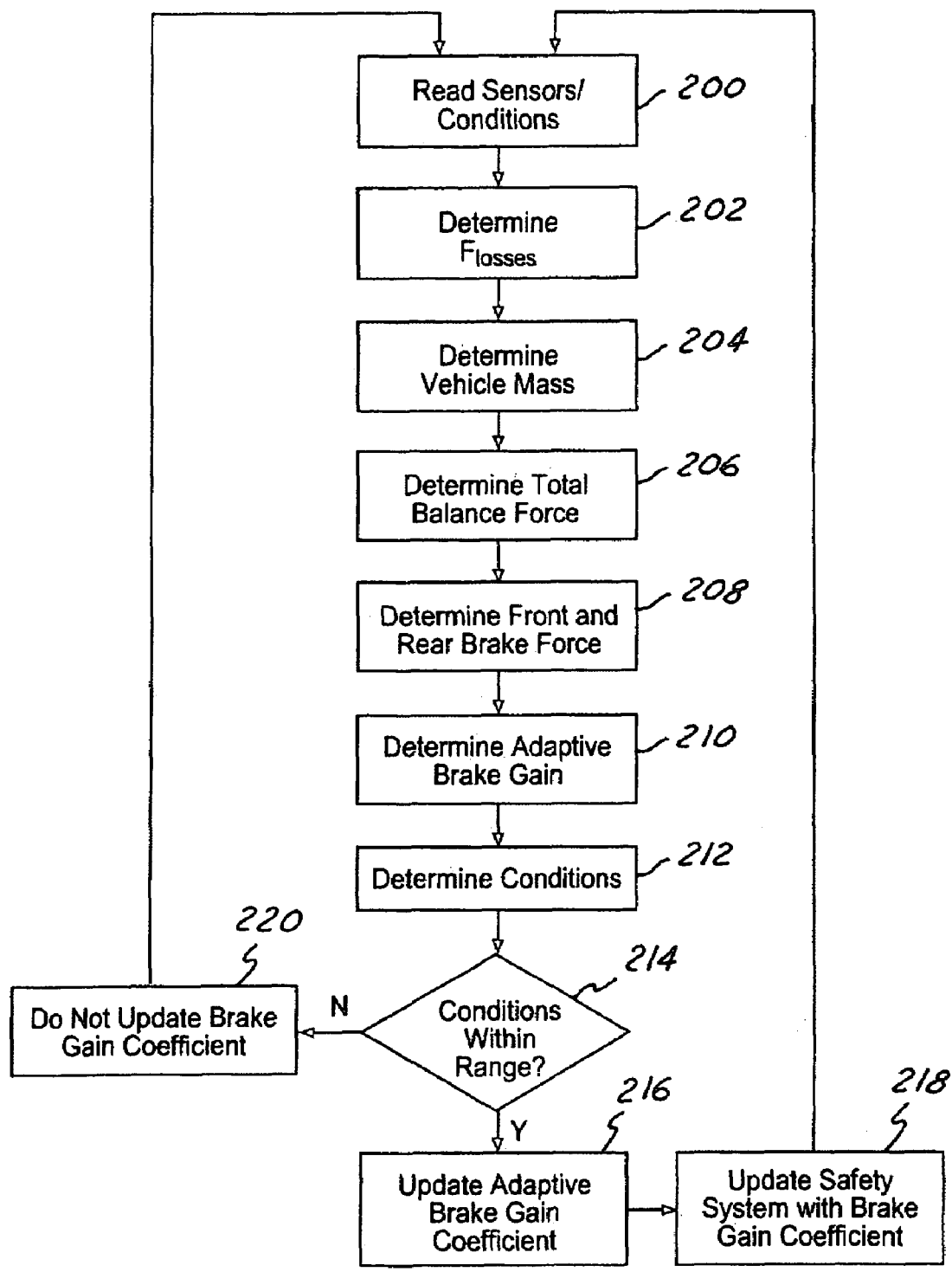
FIG. 4 is a flowchart illustrating a method for implementing the present invention.

As will be described below, the sensing system 16 may also include a lidar, radar and/or sonar sensor(s), camera(s), a GPS system and various other sensors (all of which are shown in FIG. 2 or 3 below).

The angular rate sensors and the accelerometers are mounted on the vehicle along the body frame directions $b_1$, $b_2$ and $b_3$, which are the x-y-z axes of the vehicle's sprung mass.

The longitudinal acceleration sensor is mounted on the vehicle located at the center of gravity, with its sensing direction along the $b_1$-axis, whose output is denoted as $a_x$. The lateral acceleration sensor is mounted on the car body located at the center of gravity, with its sensing direction along $b_2$-axis, whose output is denoted as $a_y$. The vertical acceleration sensor is mounted on the car body located at the center of gravity, with its sensing direction along $b_3$-axis, whose output is denoted as $a_z$.

The other reference frames used in the following discussion includes the road reference frame, as depicted in FIG. 1. The reference road frame system $r_1r_2r_3$ is fixed on the driven road surface at any instant in travel time of the vehicle, where the $r_3$ axis is along the average road normal direction computed from the normal directions of the four-tire/road contact patches.

In the following discussion, the Euler angles of the body frame $b_1b_2b_3$ with respect to the road frame $r_1r_2r_3$ are denoted as $\theta_{xbr}$, $\theta_{ybr}$ and $\theta_{zbr}$, which are also called the relative Euler angles.

Referring now to FIG. 2, control system 18 is illustrated in further detail having a controller 26. Controller 26 in this case may be a single centralized vehicle controller or a combination of controllers. If many controllers are used they may be coupled together to communicate various information therebetween, and arbitration and prioritization among multiple controllers might also be performed. Preferably, the controller 26 is microprocessor-based.

The controller 26 may be programmed to perform various functions and control various outputs. Controller 26 may also have a memory 27 associated therewith. Memory 27 may be a stand-alone memory or may be incorporated within the controller 26. Memory 27 may store various parameters, thresholds, patterns, tables or maps. For example, a map or look-up table of the effect of certain parameters on the adaptive brake gain coefficient.

The controller 26 is used for receiving information from a number of sensors, which may include speed sensors 20, a yaw rate sensor 28, a lateral acceleration sensor 32, a roll rate sensor 34, a vertical acceleration sensor 35, a longitudinal acceleration sensor 36, a pitch rate sensor 37, and steering angle position sensor 38. Sensors 28-38 may be part of an inertial measurement unit 40 or IMU.

In one embodiment, the sensors 28-37 are located at the center of gravity of the vehicle. Those skilled in the art will recognize that the sensors may also be located on various locations off the center of gravity and mathematically translated equivalently thereto.

Roll rate sensor 34 and pitch rate sensor 37 may be used to sense the vehicle roll and pitch conditions. The roll and pitch conditions of the vehicle might be conducted based on sensing the height of one or more points on the vehicle relative to the road surface. Sensors that may be used to achieve this include a radar-based proximity sensor, a laser-based proximity sensor and a sonar-based proximity sensor.

Roll and pitch conditions of the vehicle may also be sensed based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll and pitch conditions may also be sensed by sensing the force or torque associated with the loading condition of one or more suspension or chassis components including a pressure transducer in an active air suspension, a shock absorber sensor such as a load cell, a strain gauge, the steering system absolute or relative motor load, the steering system assist pressure, a tire laterally force sensor or sensors, a longitudinal tire force sensor, a vertical tire force sensor or a tire sidewall torsion sensor.

The roll and pitch condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor 35, a vehicle longitudinal acceleration sensor 36, lateral or vertical speed sensors including a wheel-based speed sensor, a radar-based speed sensor, a sonar-based speed sensor, a laser-based speed sensor, an optical-based speed sensor, a pitch gyro, or pitch rate sensors.

Lateral acceleration, roll and pitch orientations and velocities may be obtained using a global positioning system (GPS) 41.

The controller 26 may also be coupled to a lidar, radar, or sonar 42. The lidar, radar, or sonar 42 may be used to generate a velocity signal or relative velocity signal of an object. The radar or lidar may also be used to generate a trajectory signal of an object. Likewise, the velocity of the vehicle in various directions may be obtained relative to a stationary object. A lidar, radar, or sonar sensor 42 may be mounted in various positions around the vehicle including the front, sides and/or rear. Multiple sensors 42 may also be employed in multiple locations to provide multiple information from multiple positions of the vehicle. Such signals may also be used in a self parking condition, object avoidance or other systems for which brake control is required.

Controller 26 may also be coupled to a camera system 83 having cameras 43a-43e. A stereo pair of cameras 43a, 43b may be mounted on the front of the vehicle to detect target objects in front of the vehicle, to measure the object size, range and relative velocity and to classify those objects into appropriate categories. Camera 43c may be mounted on the right side of the vehicle, camera 43d may be mounted on the left side of the vehicle, and camera 43e may be directed rearward of the vehicle. Camera 43e may also include a stereo pair of cameras. All or some of the cameras may be used in a commercial embodiment. Also, a stereo pair of cameras 43a, 43b may be replaced by a single camera (43a or 43b) depending on the roll and pitch conditions measured by the system. Various types of cameras would be evident to those skilled in the art. Various types of cameras such as a CMOS-type camera or a CCD-type camera may be implemented to generate various image signals. As will be further described below, the various image signals may be analyzed to determine the various dynamic conditions of the vehicle.

Controller 26 may also be coupled to an input device 44. Input device 44 may include a keyboard or other push button type device. Input device 44 may be used to enter trailer parameters or indicate to the controller a selection or other inputs.

A reverse aid system 46 having at least one reverse aid sensor 48 may be coupled to controller 26. Reverse aid sensor 48 may be but is not limited to an ultrasonic sensor, a radar sensor, or a combination of the two. Reverse aid sensors 48 are typically located at several locations of the rear of the vehicle such as in the bumper. As will be further described below, the reverse aid system 46 may be used to provide an indication as to the presence of a trailer and may also be used to generate a particular pattern with respect to the trailer to allow the controller to have feedback with respect to the position of the trailer.

A hand wheel (also known as "steering wheel") position sensor 50 may also be coupled to controller 26. Hand wheel position sensor 50 provides controller 26 with a signal corresponding to the relative rotational position of the steering wheel within the vehicle. Various types of sensors include absolute sensors and position sensors using a center find algorithm (relative sensors). Relative sensors may use the centerfind algorithm to determine the position relative to a center position once the position is known. Both types of sensors may provide a steering angle rate signal and/or a steering direction signal. For example, the steering direction may indicate away from or toward a center position or end stop position.

A hand wheel torque sensor 52 may also be coupled to controller 26. Hand wheel torque sensor 52 may be a sensor located within the steering column for direct measurement. The steering torque may also be inferred from data available to the power steering system. The hand wheel torque sensor 52 generates a signal corresponding to the amount of torque placed on the hand wheel (steering wheel within the vehicle).

A mu ($\mu$) sensor 54 may also be coupled to controller 26. Mu sensor 54 may be a direct sensor or, more likely, is a calculated value based on available inputs, such as PROM, $\alpha_x$, $\alpha_y$, or any combination of these. For example, mu may be determined as the maximum $\alpha_y$ or $\alpha_x$ over a given time interval ($\alpha_x$ and $\alpha_y$ measure in gs). Various systems such as a yaw control system for an anti-lock brake system may generate mu. Mu is an indication of the coefficient of friction of the surface on which the vehicle is traveling. The mu sensor 54 may be used to generate a coefficient of friction for the vehicle or the coefficient of friction at more than one contact patch of the tire. Preferably, a mu is determined at each contact patch of each tire.

A throttle sensor 56 may also be coupled to controller 26. Throttle sensor 56 may, for example, be a resistive sensor. Of course, other types of throttle sensors would be evident to those skilled in the art. Throttle sensor 56 generates a signal corresponding to the position of the throttle of the vehicle. The throttle sensor 56 may give an indication as to the driver's intention regarding acceleration. Throttle sensor may also be part of a drive-by-wire type system. A throttle type sensor may also be used in electric vehicles and vehicles with diesel engines to determine the desire acceleration. These sensors may take the form of a pedal sensor.

A vehicle load sensor 58 to sense the amount of weight or payload within the vehicle may also be coupled to controller 26. Vehicle load sensor 58 may be one of various types of sensors including a suspension sensor. For example, one load sensor may be located at each suspension component. Load sensor 58 may, for example, be a pressure sensor in an air suspension. The load sensor 58 may also be a load cell. In any case, the vehicle load sensor 58 generates an electrical signal corresponding to the load on the vehicle. One sensor or preferably one sensor for each corner of the vehicle may be used. The vehicle load may, for example, be the normal load at each corner of the vehicle. By knowing the normal load at each corner of the vehicle, the total amount of loading on the vehicle may be determined.

A suspension height sensor 60 may also be coupled to controller 26. Suspension height sensor 60 may be a suspension height sensor located at each corner of the vehicle. Suspension height sensor 60 may also be part of an air suspension or other type of active suspension. Suspension height sensor 60 generates a height signal corresponding to the extension of the suspension. The suspension height sensor 60 may also be used to determine the vehicle load, normal load, and payload distribution, rather than using vehicle load sensor 58 described above. Suspension height sensor 60 may be one of various types of sensors including a laser, optical sensor, or the like.

A transmission gear selector 62 may also be coupled to controller 26. Transmission gear selector 62 may, for example, comprise a shift lever that has the PRNDL selections corresponding to the park, reverse, neutral, regular drive and low drive positions of the transmission. Also, an electrical signal may be generated in response to the position of the shift lever of a manual transmission.

A mode selector 64 may also be coupled to controller 26. Mode selector 64 may select a driver selectable mode selector such as a manually activated mechanism (e.g., push button or the like) or a voice recognition system. Mode selector 64 may, for example, select a position that corresponds to trailering. Also, mode selector may determine a park position indicating that the vehicle operator intends to park the vehicle. A U-turn position may also be selected. The mode selector may be used to enable or disable the system.

A secondary steering actuator 66 such as a turn signal actuator, an additional stalk or push buttons may also be coupled to controller 26. The secondary steering actuator 66 may also initiate the display of a turn signal indicator on the instrument panel of the vehicle. Secondary steering actuator 66 may be used to steer a trailer of the vehicle as described below. For example, the vehicle or trailer may be directed in a particular direction corresponding to the secondary steering actuator direction.

A display 68 may also be coupled to controller 26. Display 68 displays various types of displays or combinations of displays. Display 68 may display the various conditions of the vehicle such as the inputs from the input device 44, mode selector indicators from mode selector 64, and turn signal actuator 66. Display 68 may be a light on a dash panel or part of a more complex LED or LCD display on the instrument panel of the vehicle. Of course, other locations for the display may include an overhead display or the like. Display 68 may also be used to display the projected position of a trailer relative to the vehicle.

Hand wheel switches 70 may be coupled to the steering or hand wheel. Hand wheel switches 70 may be labeled left and right corresponding to a left and right direction. Hand wheel switches 70 may also be used to independently control left and right trailer brakes to help maneuverability of the trailer.

Based upon inputs from the sensors and/or cameras, GPS, and lidar or radar, controller 26 may control a safety device 84. Depending on the desired sensitivity of the system and various other factors, not all the sensors 20, 28-66, cameras 43a-43e, lidar or radar 42, or GPS 41 may be used in a commercial embodiment. Safety device 84 is part of a vehicle subsystem control. Safety device 84 may control a passive safety device 86 such as an airbag, a pressure sensor 89, a steering actuator 88, or a braking system controller 90 at one or more of the wheels 12a, 12b, 13a, 13b of the vehicle. Engine intervention 92 may act to reduce engine power to provide a safety function. Also, other vehicle components such as a suspension control 94 may be used to adjust the suspension and provide for various types of control in dynamic conditions such as brake-steer. An anti-roll bar system 96 may be used to prevent rollover. The anti-roll bar system 96 may comprise a front or rear active anti-roll bar, or both. It should also be noted that the systems 88-96 may act alone or in various combinations. Certain systems 88-96 may act to provide a safety function when various dynamic conditions are sensed.

Steering actuator 88 may include the position of the front right wheel actuator, the front left wheel actuator, the rear left wheel actuator, and the right rear wheel actuator. As described above, two or more of the actuators may be simultaneously controlled. For example, in a rack-and-pinion system, the two wheels coupled thereto are simultaneously controlled.

Safety device 84 may also comprise a roll stability control system 102, an anti-lock brake system 104, a yaw stability control system 106, and/or a traction control system 108. The roll stability control system 102, anti-lock brake system 104, yaw stability control system 106, and traction control system 108 may be coupled to brake system 90. Further, these systems may also be coupled to steering actuator 88. Engine intervention 92 may also be coupled to one or more of the devices, particularly the roll stability control system, yaw stability control system, and traction control system. Thus, the steering actuator 88, brake system 90, engine intervention 92, suspension control 94, and anti-roll bar system 96 may be part of one of the dynamic control systems 102-108. As will be further described below, the yaw stability control system 106 may have thresholds that are set by the controller 26 and that may be changed based upon the various conditions of the vehicle such as a trailering condition.

A warning device 112 may also be coupled to controller 26. Warning device 112 may warn of various conditions such as an impending rollover, understeer, oversteer, an approach of an in-path object, or impending trailer interference during a reverse direction. The warnings are provided in time for the driver to take corrective or evasive action. The warning device 112 may be a visual display 114 such as warning lights or an alpha-numeric display such an LCD screen. Display 114 may be integrated with display 68. The warning device 112 may also be an audible display 116 such as a warning buzzer, chime or bell. The warning device 112 may also be a haptic warning such as a vibrating steering wheel. Of course, a combination of audible, visual, and haptic display may be implemented.

A level-based system 118 may also be coupled to controller 26. Level-based system 118 uses the pitch level or angle of the vehicle to adjust the system. Level-based system 118 may, for example, be a headlight adjustment system 120 or a suspension leveling system 122. Headlight adjustment system 120 adjusts the beam pattern downward for a loaded vehicle. Suspension leveling system 122 adjusts the suspension at the various corners of the vehicle to maintain the vehicle relatively level to the road. The level-based system 118 may also make an adjustment based on the roll angle of the vehicle.

Brake system controller 90 is coupled to a front left brake 130a, front right brake 130b, rear left brake 130c, or rear right brake 130d. Brake system controller 90 controls the pressure to each of the brakes. The brake pressure at each of the brakes may be directly measured by a pressure sensor or sensors 132. The temperature at each brake may be measured by a brake temperature sensor 134. The brake system controller 90 sets the pressure so that a predetermined amount of brake torque acts on each wheel. The brakes and brake system controller form the brake system A powertrain control module (PCM) 140 may also be coupled to the controller. The PCM 140 generates a tractive force $F_{tractive}$. The tractive force may correspond directly to the resistive force. The tractive force may vary depending on speed.

Referring now to FIG. 3, a vehicle 10 is illustrated relative to a trailer 150 on a road surface 152 having a slope θ. The vehicle 10 and trailer are illustrated with various force acting thereon as is described below. It should be noted a trailer is not required in the present invention. The present invention can, however, take the trailer 150 into account.

The present invention provides a method that can be used to adaptively obtain the brake torque gain coefficient, $K_{br}$, which relates brake wheel torque to the pressure applied to the caliper as follows:

The brake torque gain coefficient $K_{br}$ is highly variable with respect to many physical parameters and environmental factors. The adaptive approach described below compensates for many of these parameters by continually modifying the value of $K_{br}$ as a function of various conditions such as but not limited to brake component age, wear, pressure, speed, and replacement parts. The brake torque gain coefficient is important in electronic brake systems. An accurate value is desired for optimal operation of, for example, wheel lift detection in a roll stability control system. Improving the accuracy of the value of $K_{br}$ also leads to improved performance of ABS, traction control, and IVD, RSC, and other advanced systems using electronic control of the brake system. For example, this technique can be used with electro-hydraulic brakes to provide improved functionality and adaptive deceleration vs. pedal force characteristics.

The following description is broken into two parts: A) the determination of the brake torque gain coefficient, $K_{br}$, and B) the adaptive algorithm used to actually update the current value of $K_{br}$.

Determining $K_{br}$

The present invention provides a method to better control vehicle brake torque modulation. This is accomplished by using the below described methods to determine the actual brake gain coefficient. The method may be performed continuously, periodically, or at various times. The brake torque gain coefficient, $K_{br}$, which is defined as $$K_{br} = \text{Brake Torque/Brake Caliper Pressure} \quad (1)$$

where $K_{br}$ has units of torque/pressure (e.g., Newton-meter/bar).

Since the brake caliper pressure is estimated in the brake system controller 90 during all brake events, the brake torque may be predicted accurately if $K_{br}$ is known. As mentioned above, the current method used in the brake electronic control unit is to assume a constant value of $K_{br}$. However, the value of $K_{br}$ can change with respect to many factors, resulting in uncertainty in brake torque prediction. Some of these factors are: wheel (vehicle) speed, brake pressure, brake wear, other pseudo steady state conditions such as pad age and rotor condition and friction material. Various inputs may be provided upon servicing such as direct input of the information through the input keyboard device 44 or other device.

The variation of $K_{br}$ with respect to other factors may require additional sensors, such as variation of $K_{br}$ with respect to temperature, moisture content, piston knock back, and other highly transient conditions.

There are many benefits of more accurately determining $K_{br}$. Several examples include modulating brake caliper pressure to provide a given wheel torque during active wheel lift detection, optimizing transition control such as transitioning and roll control, and optimized feed-forward control in the various safety systems.

The approach used to actively determine the value of the brake torque gain coefficient, $K_{br}$, is outlined below. Rearranging Equation (1) gives Brake Torque=$K_{br}$*Brake Caliper Pressure (2)

Brake caliper pressure is estimated by the brake system controller 90 or measured directly with sensors 132. Brake torque is an unknown quantity, but can be determined from the vehicle state information. Developing Equation (2) for the front and rear brakes, and transforming the result from brake torque to brake force gives $$F_{br,f} = K_{br,f} * P_{estimated,f} / \rho_{slr} \quad (3a)$$

and $$F_{br,r} = K_{br,r} * P_{estimated,r} / \rho_{slr} \quad (3b)$$

where $F_{br,f}$ and $F_{br,r}$ are the front and rear brake forces, respectively, $K_{br,f}$ and $K_{br,r}$ and $P_{est,f}$ and $P_{est,r}$ are the brake torque gains and estimated pressure for the front and rear brakes, respectively (note that no interventions from the brake controller is assumed, so that the right and left brake pressures are identical), and $P_{slr}$ is the assumed tire static loaded radius. $P_{est,f}$ and $P_{est,r}$ are calculated in the brake controller using a hydraulic model of the brake pressure and measured master cylinder pressure. Pest can also be obtained via direct measurement (brake pressure transducers at hydraulic control unit, caliper, etc. For a brake system, the ratio between the front and rear brake gain can be assumed (based on brake physical parameters) to be proportionality constant, where $$K_{br,f}/K_{br,r} = C_{br} \quad (3c)$$

and $C_{br}$ is assumed a constant for a vehicle, or is assumed to be known versus $P_{est}$, $\alpha_x$, etc.

Assuming no trailer brakes are being applied, the total brake force of the vehicle, $F_{br,tot}$ is $$F_{br,tot} = F_{br,f} + F_{br,r} \quad (3d)$$

Solving Equation (3c) for $K_{br,f}$ and substituting the result into Equation (3a) gives $$F_{br,f} = C_{br} * K_{br,r} * P_{estimated,f} / \rho_{slr} \quad (3e)$$

Substituting this equation and Equation (3b) into Equation (3d), and rearranging gives $$(C_{br}+1) K_{br,r} * P_{estimated,r} / \rho_{slr} = F_{br,tot} \quad (3f)$$

The rear brake torque gain, $K_{br,r}$ can then be obtained by rearranging Equation (3f) giving $$K_{br,r} = F_{br,tot} * \rho_{ser} / \{P_{estimated,r} * (C_{br}+1)\} \quad (4a)$$

Finally, the front brake torque gain may then be obtained by substituting this value of $K_{br,r}$ into Equation (3c) and solving for $K_{br,f}$ giving $$K_{br,f} = C_{br} * K_{br,r} \quad (4b)$$

Hence, the front and rear brake torque gains can be determined once the front and rear brake forces, $F_{br,f}$ and $F_{br,r}$ are known. The procedure to solve for these is described below.

The first step is to determine the forces acting on a vehicle. These are shown in the free body diagram in FIG. 3.

Summing the forces in the longitudinal direction results in Equation (5) below. This assumes derivation of quasi steady-state vehicle operation: e.g., no ABS, traction control, AYC, nor RSC activations.

$$\Sigma F_{x'} = F_{tractive} - F_{roll,v} - F_{roll,t} - R_{aero,v} - F_{aero,t} - F_{wind,t} - F_{br,f} - F_{br,r} - F_{br,r} - F_{br,t} - (m_v + m_t) g \sin\theta = (m_v + m_t) a_x' \quad (5)$$

where $$a_x' = dv_x/dt \quad (6)$$

is the rate of change of vehicle speed. $\alpha_x'$ can be determined from wheel speed sensors or other methods (time rate of change of reference velocity of vehicle). Note that $v_x$, hence $dv_x/dt$ are calculated from the wheel speed sensors for a stable vehicle. The grade, $\theta$, (in degrees or radians) may be estimated from the longitudinal acceleration, $A_{x\_sens}$, obtained from the longitudinal accelerometer and the rate of change of speed, $a_x'$, of the vehicle by first expressing the vehicle's acceleration in the x direction as $$A_{x\_sens} = a_x' + g \sin\theta \quad (7a)$$

Then rearranging and solving for the grade, i.e., $$\theta = \sin^{-1}\{(A_x - a_x')/g\} \quad (7b)$$

The predicted axle torque, $F_{tractive}$, may be obtained from the vehicle's powertrain control module (PCM) predicted axle torque:

$$F_{tractive} = \text{PCM predicted Axle Torque} * \rho_{slr} \quad (8)$$

Other forces in Equation (5) are: $F_{roll,v}$ and $F_{roll,t}$ are the rolling resistance of the vehicle and trailer, respectively; $F_{br,f}$, $F_{br,r}$ are defined in Equations (3), and $F_{br,t}$ are the trailer brake forces; $F_{aero,v}$ and $F_{aero,t}$ are the aerodynamic forces from the vehicle and trailer, respectively; and $F_{wind}$ is the estimated total aero force due to the wind.

Note also that the vehicle can be trailering and/or carrying external cargo, such as on a luggage rack. The case when trailer brakes are used, special modifications are required to the above logic as discussed below.

The known values in Equation (5) are $F_{tractive}$, $a_x$, and $A_x$. All other variables need to be determined. First, the losses in Equation (5) due to rolling resistance and aerodynamics forces are grouped together in a force referred to as $F_{losses}$; i.e., $$F_{losses} = F_{roll,v} + F_{roll,t} + F_{aero,v} + F_{aero,t} + F_{wind,t} \quad (9)$$

Note that $F_{losses}$ is a function of vehicle speed, loading and wind speed/direction and can be mapped/recorded as a function of vehicle speed and wind speed direction, etc. The following steps are followed to determine the unknowns in Equation (5). Remember that the goal is to determine the front and rear brake force, $F_{br,f}$ and $F_{br,r}$ so that Equations (4) can be used to determine the front and rear brake force, In step 200, the various sensors/conditions are determined. These may include vehicle speed and the tractive force from the powertrain control module. In step 202 the values of Flosses are determined in step 202 using Equation (9).

The total rolling resistance and aerodynamic drag are found. The preferred conditions of the vehicle are that the vehicle speed is constant ($a_x = 0$), the brakes are not applied and grade $\theta$ in FIG. 3 is approximately zero. From the powertrain control module, the predicted axle torque ($F_{tractive}$) and vehicle speed are known.

For the above conditions, Equation (3) simplifies to:

$$F_{losses} = F_{roll,v} + F_{roll,t} + F_{aero,v} + F_{wind} + F_{aero,t} = F_{tractive} \quad (10)$$

Note $F_{losses}$ may be determined as a function of speed (e.g., determined at several speeds), and is small at very low speeds. This value may be calibrated by experimentally determining these values since $F_{tractive}$ is known ($F_{tractive}$ calculated via Equation (8)). Equation (10) assumes no ABS, T. C., AYC or RSC activations (i.e., quasi steady-state, stable vehicle).

In step 204, vehicle mass is determined. The vehicle mass as well as a trailer mass may be determined. It is preferred that the brakes are not applied.

The values that are known are the predicted axle torque ($F_{tractive}$) vehicle speed change $a_x{}'$, longitudinal acceleration $A_{x\_sens}$, grade, $\theta$ via Equation (7b), and resistive forces determined in step 202.

For these conditions, Equation 5 simplifies to:

$$(m_v+m_t)=(F_{tractive}-F_{losses})/(a_x+g\sin\theta) \quad (11)$$

Hence, the sum of the vehicle and trailer mass may be determined. Note that other means of solving for these quantities can also be used.

In step 206, the total brake force is determined.

The preferred conditions include that the brakes are being applied, estimated front and rear brake pressures are known, and no ABS, TSC, IVD, or RSC interventions (e.g., no brake controller activations).

For these conditions, Equation (5) simplifies to:

$$F_{br,tot}=F_{br,f}+F_{br,r}+F_{br,t}=F_{tractive}+F_{losses}+(m_v+m_t)g\sin\theta+(m_v+m_t)a_x, \quad (12)$$

where $F_{tractive}$ is determined in Equation (8) from the PCM, where $F_{losses}$ is determined in step 202, where $m_v$ and $m_t$ is determined in step 204, and $\theta$ is determined in Equation (76).

In step 208, the total front and rear brake force and front and rear brake torque gain coefficients, $K_{b,f}$ and $K_{b,r}$ in step 210 are determined.

It is preferred that the trailer brakes are not applied (e.g., if no trailer is suspected from the results of steps 202 or 204) and, the below procedures assume $F_{br,t}$ (trailer brake force)=O:.

Knowns: $F_{br, tot}$ from Equation (12) (step 206)

Using Equation (4a), all items on the right hand side of Equation (4a) are known. Hence, $K_{br,r}$ can be determined directly from Equation 4(a).

Similarly, the front brake torque gain may then be obtained directly from Equation (4b).

Hence, $K_{br,f}$ and $K_{br,r}$ are now known. The next step relates to details regarding the calculation of these parameters, and how to use these values to update the previous or default values used for $K_{br,f}$ and $K_{br}$.

Updating the Current Value of $K_{br}$: Adaptive $K_{br}$ Strategy

Note that $K_{br,f}$ and $K_{br, r}$ can be updated for specific conditions that are determined in step 212. They may be recorded as a function of various conditions such as vehicle speed, brake pressure, ambient temperature, brake temperature wear, etc.

The other key item is when to calculate $K_{br, f}$ and $K_{br, r}$. For example, the adaptive gain coefficients may be determined every stop, continuously, periodically, or some other cycle or strategy.

Now that the brake torque gains have been determined in step 210, a strategy is needed to update the previous (existing) values of $K_{br, f}$ and $K_{br, r}$.

Some issues include how and when to use the newly calculated values of $K_{br,f}$ and $K_{br, r}$ to update the previous values. It is important to consider both the conditions for which update should occur and the strategy for updating. Potential techniques are presented below.

Conditions for which to Determine $K_{br,f}$ and $K_{br,r}$

Listed below are some of the special conditions that should be considered when $K_{br,f}$ and $K_{br,r}$ should and should not be calculated and used to update the previous values in step 212:

Calculate $K_{br,f}$ and $K_{br,r}$ when no brake controller interventions are present so the left and right brake pressures are assumed identical and estimates are accurate.

Calculate $K_{br,f}$ and $K_{br,r}$ when the vehicle is stable: quasi-steady state condition, slow steering inputs, low lateral force, etc.

Calculate $K_{br,f}$ and $K_{br,r}$ when moderate brake temperatures exist (T min<temp<T max)

Calculate $K_{br,f}$ and $K_{br,r}$ when no trailer or trailer brakes are present.

Calculate $K_{br,f}$ and $K_{br,r}$ as a function of vehicle speed ranges/bands

Determine when values of calculated $K_{br,f}$ and $K_{br,r}$ are above a lower band ($K_{br,f\ lower}$ and $K_{br,r\ lower}$) and below an upper band, ($K_{br,f\ upper}$ and $K_{br,r\ upper}$) These upper and lower bands are meant to represent physical limits on the probable/acceptable values of $K_{br,f}$ and $K_{br,r}$.

When the above conditions are within range in step 214, step 216 is performed to update the adaptive brake gain coefficients.

The update rate may include various possible approaches for updating the prior values of $K_{br,f}$ and $K_{br,r}$. One way to perform the update is to simply use the latest calculated values. Another way is to use the running average of acceptable values of $K_{br,f}$ and $K_{br,r}$. Yet another way is to use low pas filtered values of acceptable values of $K_{br,f}$ and $K_{br,r}$. Of course, various combination of filtered and average values, maximum rates of change of the values, etc. may be used.

Many other techniques may be utilized for updating the current values of $K_{br,f}$ and $K_{br, r}$ with the most recently calculated values.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling an automotive vehicle comprising:
   determining the automotive vehicle to be in a stable condition;
   determining an adaptive brake gain coefficient in response to said stable condition determination;
   comprising determining the automotive vehicle to be in a quasi-steady state; and
   controlling a brake system in response to the adaptive brake gain coefficient.

2. A method as in claim 1 wherein determining the automotive vehicle to be in a stable condition further comprises detecting slow changing steering wheel angle.

3. A method as in claim 1 wherein determining the automotive vehicle to be in a stable condition further comprises detecting slow changing steering.

4. A method as in claim 1 wherein determining the automotive vehicle to be in a stable condition further comprises detecting a low lateral force.

* * * * *